United States Patent [19]

Araki et al.

[11] Patent Number: 4,702,163

[45] Date of Patent: Oct. 27, 1987

[54] PRINTING APPARATUS FOR PRINTING BOTH SURFACES OF CHIP TYPE ARTICLE

[75] Inventors: Mikio Araki, Toyonaka; Shigeru Yonamine, Takatsuki; Kouichi Yukawa, Nagaokakyo, all of Japan

[73] Assignee: Idec Izumi Corporation, Osaka, Japan

[21] Appl. No.: 837,938

[22] Filed: Mar. 10, 1986

[30] Foreign Application Priority Data

Mar. 11, 1985 [JP] Japan ................................ 60-48743

Apr. 27, 1985 [JP] Japan ................................ 60-91639

[51] Int. Cl.[4] ........................ B41F 17/00; B65G 47/00

[52] U.S. Cl. ...................................... 101/35; 198/404; 198/417

[58] Field of Search ................... 101/35, 36, 37, 38 R, 101/38 A, 39, 40, 126; 198/404, 402, 417

[56] References Cited

U.S. PATENT DOCUMENTS

| | | | |
|---|---|---|---|
| 2,335,239 | 11/1943 | Gladfetter et al. | 101/37 X |
| 2,923,397 | 2/1960 | Parrish | 198/404 |
| 3,122,994 | 3/1964 | Crabtree et al. | 101/35 |
| 3,124,065 | 3/1964 | Bozek et al. | 101/37 |
| 3,172,355 | 3/1965 | Freeman | 101/37 X |
| 3,176,825 | 4/1965 | Rudszinat et al. | 198/402 |
| 3,253,538 | 5/1966 | Rudolph et al. | 101/40 |
| 3,335,658 | 8/1967 | Uschmann | 101/35 |
| 3,583,544 | 6/1971 | Prodzenski | 198/404 |
| 3,683,849 | 8/1972 | Atchley et al. . | |
| 3,850,096 | 11/1974 | Taniguchi | 101/40 |
| 4,492,299 | 1/1985 | McLeod | 198/417 |

FOREIGN PATENT DOCUMENTS

| | | | |
|---|---|---|---|
| 52653 | 3/1984 | Japan | 101/35 |
| 166460 | 8/1985 | Japan | 101/35 |

OTHER PUBLICATIONS

IBM Technical Disclosure Bulletin, vol. 17, No. 4, Sep. 1974, p. 1065, New York, U.S.; T. J. Cochran et al.; "Inverter for Flat Parts Being Indexed on a Belt".

*Primary Examiner*—Clifford D. Crowder
*Attorney, Agent, or Firm*—Pollock, Vande Sande & Priddy

[57] ABSTRACT

A printing apparatus for printing on both surfaces of a chip type article comprises first and second transfer paths for transferring the chip type article, an article feed device for feeding the article to the first transfer path, a printing device for printing on the article on the first transfer path and on another article on the second transfer path, an article removing device for removing the printed article on the second transfer path, and an article reversing device for reversing upsidedown the printed article on the first transfer path and for delivering to the second transfer path.

10 Claims, 8 Drawing Figures

PRINTING APPARATUS FOR PRINTING BOTH SURFACES OF CHIP TYPE ARTICLE

BACKGROUND OF THE INVENTION

The present invention relates to a printing apparatus for printing marks such as numerals, symbols, etc., on both upper and lower surfaces of a microminiature article such as a chip type part, for example, a rectangular chip capacitor, a rectangular chip resistor, or the like.

Although a chip type electronic part such as a chip capacitor, a chip resistor, or the like is very minute and is rectangular shaped having, for example, a width of 1.6 mm, a length of 3.2 mm, a thickness of 0.6 mm, and a weight of 10 mg, it must be printed to indicate a resistance value, an electrostatic capacity value, etc.

In the prior art, U.S. Pat. No. 3,122,994 or Japanese Patent Unexamined Publication No. 52653/84 teach printing apparatus for printing marks on the small article. The printing apparatus disclosed in U.S. Pat. No. 3,122,994 can print the marks on the small article such as a control relay or electronic timer which has a side more than several centimeters, but cannot print the marks on the microminiature article such as the chip type part.

Further, the printing apparatus disclosed in Japanese Patent Unexamined Publication No. 52653/84 can print the mark not only one surface (upper or lower surface) of the chip type part, but cannot print the marks on both surfaces. Therefore, a process to turn the printed surface to the upper side should be required when the electronic part is to be mounted on a printed substrate or the like.

In other words, an apparatus for printing a rated value, etc., on both upper and lower surfaces of the microminiature article has not been considered heretofore.

SUMMARY OF THE INVENTION

An object of the present invention is to provide an apparatus for printing on both upper and lower surfaces of a chip type part to eliminate the process for mounting the electronic component on a printed substrate or the like. Other object of the invention is to provide a technique for manufacturing the printing apparatus requiring a small installation floor space, having a simple structure, and being inexpensive. Still another object of the present invention is to simplify an article reversing mechanism for printing on both surfaces of the article.

DESCRIPTION OF THE PREFERRED EMBODIMENTS

Figure 1:
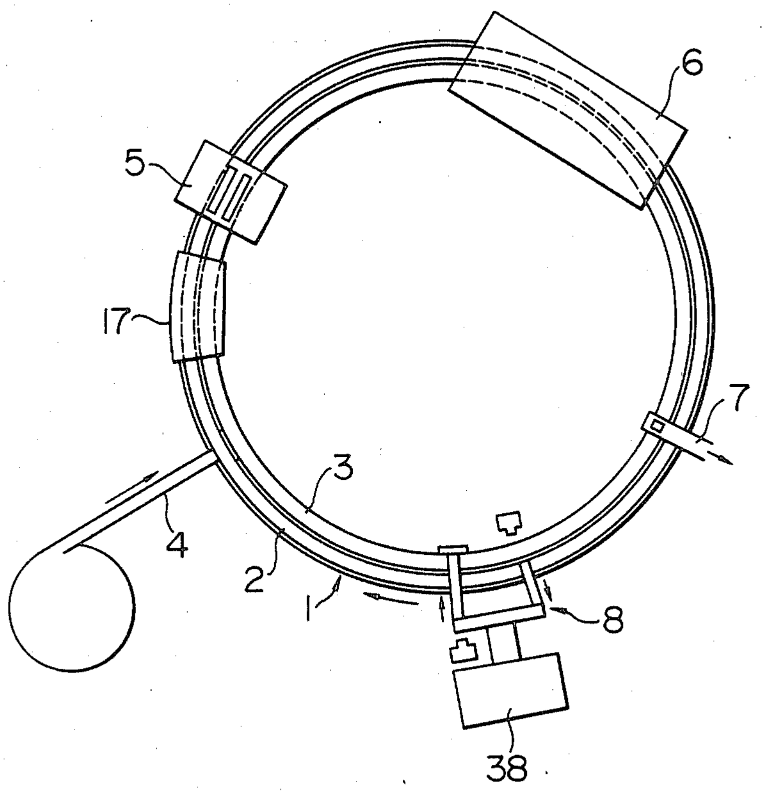
FIG. 1 is a plan view of a first embodiment of the present invention.

With reference to FIG. 1, on the peripheral portion of a turntable 1, there are provided with double parallel transfer paths 2 and 3 along concentric circles. The outer transfer path 2 constitutes a first transfer path, and the inner transfer path 3 constitutes a second transfer path. Along these circular, loop-shaped transfer paths, there are disposed with sequentially an article feed device 4, an article positioning device 17, a printing device 5, an ink drying device 6, an article removing device 7, and an article reversing device 8 having a motor 38. The article feed device 4 places an article to be printed on the first transfer path. The printing device 5 performs printing parallelly on articles to be printed on the first and second transfer paths. The ink drying device 6 irradiates energy of, for example, ultraviolet light or the like to the printed surfaces of the articles on the first and second transfer paths. The article removing device 7 removes the printed article on the second transfer path to the outside. The article reversing device 8 takes out the article printed to one surface of it to be printed to the other surface of it on the first transfer path and places it on the second transfer path after reversing upsidedown.

Figure 2:
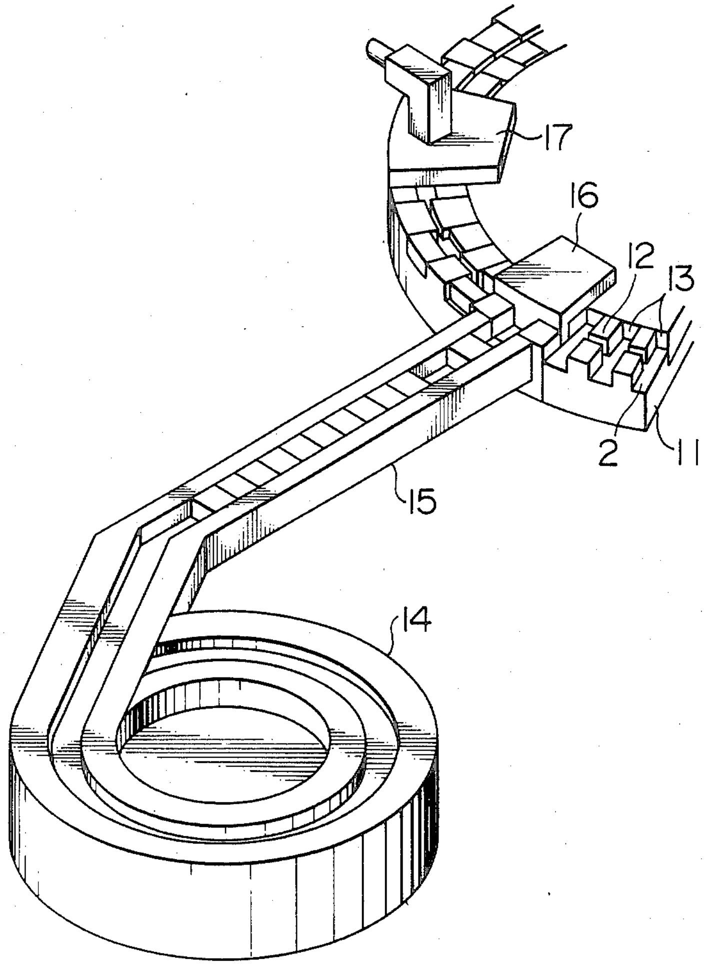
FIG. 2 is a partial perspective view of the first embodiment.

Next, referring to FIG. 2, a rim 11 of the peripheral portion of the turntable 1 is divided by a dividing groove 12 into the first and second transfer paths, and grooves 13, penetrating in radial directions are provided at predetermined pitches. The first transfer path 2 is constituted by the outer side row of the grooves 13, and the second transfer path 3 is constituted by the inner side row of the grooves 13.

A loader 15 is provided to feed an article W to be printed from an article feed device 14 to the first transfer path, and a stopper 16 is provided on the dividing groove 12 at a position of the exit of the loader 15 to prevent the article W to be printed from entering into the second transfer path.

Figure 3:
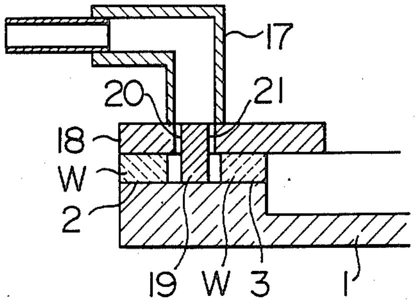
FIG. 3 is a sectional view of an article positioning device in the first embodiment.

The article positioning device 17, as shown in a sectional view thereof in FIG. 3, is provided with a cover 18 to cover the upper face of the rim 11, and a partition wall 19 which fits the dividing groove 12 is provided on the cover 18. Small holes 20 and 21 are bored in the cover 18 near the outer side and inner side of the partition wall 19, and these small holes 20 and 21 are communicate with an air source (not shown). The article W to be printed which is held at the inner or outer side on the groove 13 is absorbed toward the wall face of the partition wall 19 when the article W passes through the small hole 20 or 21, and the positioning of the article W in the radial direction is achieved.

Figure 4:
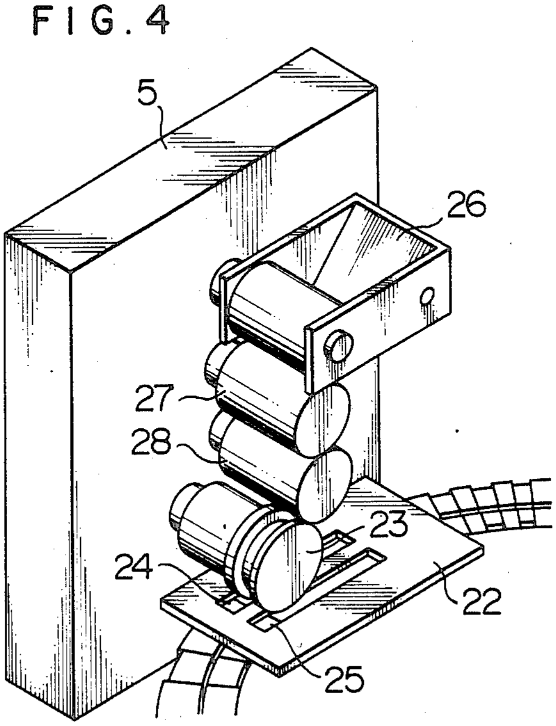
FIG. 4 is a perspective view of a printing section in the first embodiment.

FIG. 4 shows the printing device 5. A pressing plate 22 is provided on the upper faces of the transfer paths, and it prevents the article to be printed from being adhered to a printing roller 23 and being raised. Slits 24 and 25 are formed in the pressing plate 22 to expose portions on which the printing is to be made. Ink is supplied from an ink bottle 26 to the printing roller 23 through a series of rollers 27. A roller 28 and the printing roller 23 are constructed in a manner that the articles on the first and second transfer paths are printed parallelly and simultaneously. An ultraviolet curing ink is used as the ink. The ink drying device 6 is constituted by an ultraviolet-light irradiator which irradiates the articles on the first and second transfer paths. The article removing device 7 absorbs the article on the second transfer path by a vacuum source (not shown), and stores it in a container box.

Figure 5:
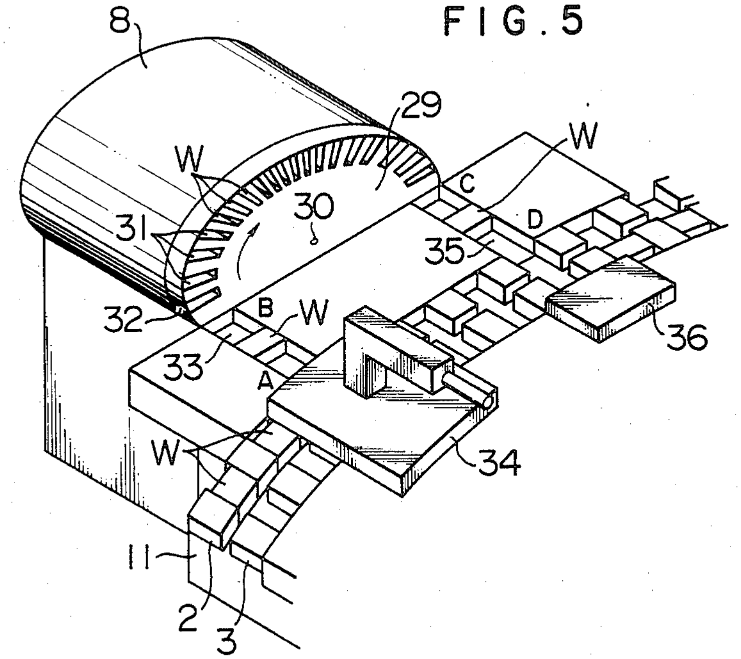
FIG. 5 is a perspective view of an article reversing device in the first embodiment.

The article reversing device 8 in the first embodiment is shown in FIG. 5. A reversing disk 29 is provided outside the first and second transfer paths 2 and 3 of the turntable 1. A rotation shaft 30 of the reversing disk 29 is supported in parallel with the face of the turn table 1, and grooves 31, . . . , 31 are formed in the peripheral edge of the reversing disk 29 at predetermined pitches to hold the article W to be printed therein. Further, a cover 32 is provided surrounding the outer side of the peripheral edge of the reversing disk 29 to prevent falling of the article W. The reversing disk 29 is driven in rotation in synchronism with the turntable 1 by the motor 38 shown in FIG. 1. An air shoot 33 is provided extending from a point A on the first transfer path 2 to a point B on the reversing disk 29, and an air blow-out port 34 is provided to deliver the article at the point A on the transfer path to the point B. In addition, a further air shoot 35 is provided extending from a point C on the reversing disk 29 to a point D, and a stopper 36 is provided at the inner side of the second transfer path 3, and an air blow-out port (not shown) is provided at a suitable position to deliver the article at the point C in the groove 31 to the second transfer path 3. The article to be printed reached the point A is transferred to the groove 31 of the reversing disk 29 while retaining the printed surface facing upward, and as a result of a half rotation of the disk 29, the printed surface is reversed to face downward, and the article is transferred to the second transfer path while retaining this condition. After the article has been delivered to the second transfer path 3, the article is positioned through the positioning device 17, and the printing is made on the lower surface of the article by the printing device 5. Following this, the article is dried by the drying device 6, and is taken out to the outside by the removing device 7.

Figure 6:
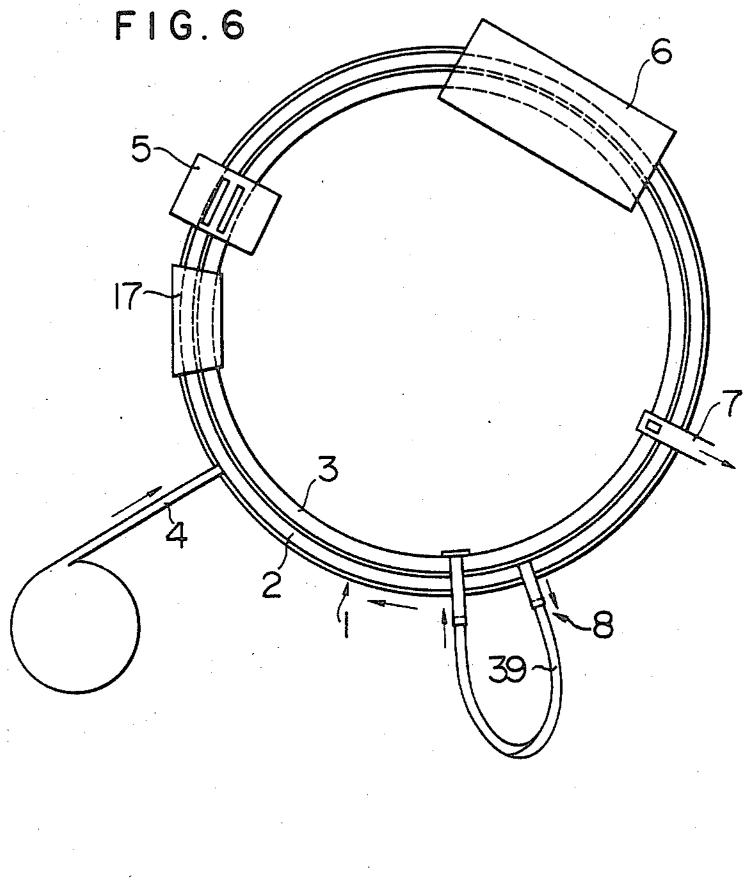
FIG. 6 is a plan view of a second embodiment of the present invention.

FIG. 6 shows a second embodiment, however, it differs from the first embodiment in an article reversing device 8. In this article reversing device 8, a flexible tube 39 is used.

Figure 7:
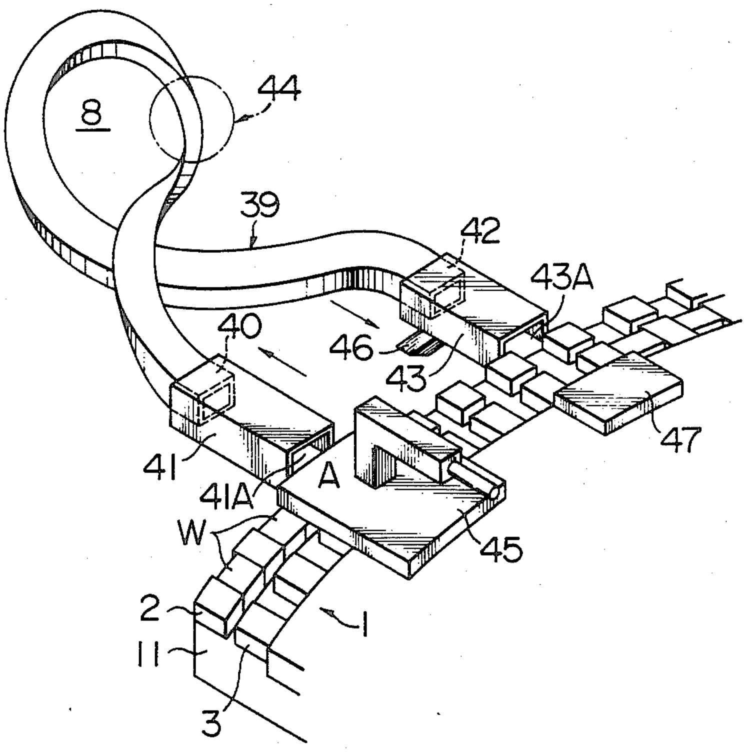
FIG. 7 is a perspective view of an article reversing device in the second embodiment.

The article reversing device 8 in the second embodiment is shown in FIG. 7. At the outside of first and second transfer paths 2 and 3 of a turntable 1, there is provided with a flexible tube 39. A suction-side end 40 of the tube 39 is connected to a linear feeder 41 sticking fast thereto in a fitting fashion, and a discharge-side end 42 at the other end of the tube 39 is connected to a further linear feeder 43 sticking fast thereto similarly in the fitting fashion. Moreover, the tube 39 is bended at a portion between both ends 40 and 42 to form a reversing section 44. The one linear feeder 41 has an opening-side end 41A disposed opposing to a point A in the first transfer path 2, and the tube 39 is provided with an air blow-out port 45 to deliver the article on the transfer path. Further, the other linear feeder 43 has an opening-side end 43A disposed opposing to the transfer path to which the article is to be delivered, and also, the linear feeder 43 is provided with an air suction port 46 so that the article fed to the entrance of the linear feeder 41 by an air source (not shown) through the tube 39 and the linear feeder 41 is sucked into the linear feeder 43. Further, reference numeral 47 designates a stopper disposed to oppose to the linear feeder 43. In such an arrangement, the article to be printed which reached the point A on the first transfer path 2 is sucked into the tube 39 through the linear feeder 41 while retaining the printed surface facing upward. The article to be printed, on its way through the tube 39, is reversed with respect to upper and lower surfaces at the bent reversing section 44, and thus, the article is delivered from the linear feeder 43 to the second transfer path 3 while the printed surface is reversed to face downwardly.

Figure 8:
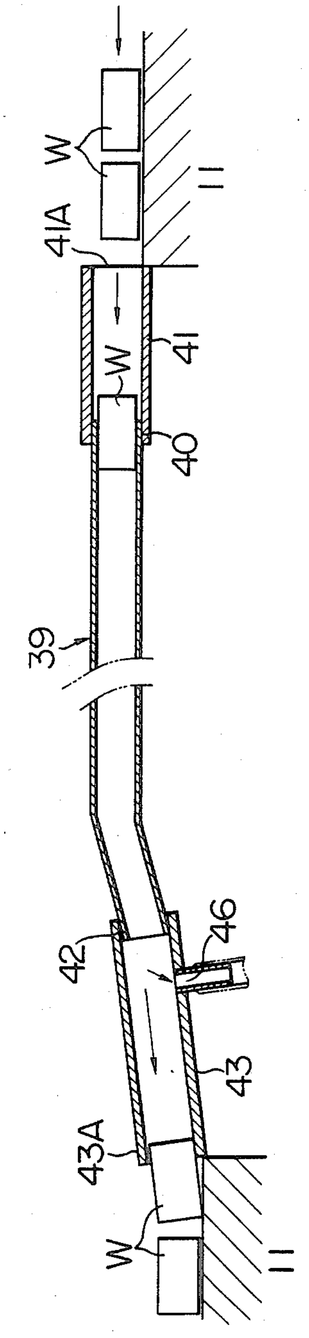
FIG. 8 is a sectional view of the article reversing device shown in FIG. 7.

With reference to FIG. 8, the article W transferred to the discharge-side end 42 of the tube 39 due to a suction force exerted from the air suction port 46 passes through the linear feeder 43 and is discharged to the second transfer path 3. In this case, vibrations are caused in the linear feeder 43 due to the suction force from the air suction port 46, and by virtue of the vibrations, the article is discharged to the transfer path 3 without stagnating at the suction port 46.

According to the present invention, the printing apparatus for printing both surfaces of the microminiture article can be easily produced, and although the floor space thereof is the same as that of the prior art one-surface printing apparatus, and further, in spite of its both-surface printing capability, substantially only one device is needed for each of the turntable, printing device, drying device, etc., and thus, the overall apparatus can be made small in size and simple.

Moreover, since a tube is used as the reversing device in this type of the printing apparatus, the reversing device can be made in a very simple arrangement. Accordingly, not only the components can be made in a smaller size but the assembling thereof can be achieved in a simple manner and inexpensively. Furthermore, since the speed of transfer is easily adjustable by varying the suction force, it is possible to increase the speed of transfer and to improve the stability as compared with a system of combination of mechanism components. Further, even when the shapes of the articles to be printed differ variously, by using a tube having a shape corresponding to that of an article to be printed, the purpose of reversing the article to be printed can easily be attained. In addition, since the flexibility of the tube is utilized, even when an obstacle is present in the tube during the transfer of the article, the article can easily get over the obstacle. As a result, the first and second transfer paths are not necessarily required to be formed in the plane loop shape as shown in the FIGURES, and even other types may easily be adapted. Accordingly, it is possible to provide general-purpose properties at the time of design of this type of apparatus.

We claim:

1. A printing apparatus for printing on both surfaces of a chip type article comprising:
   - first and second transfer paths for transferring said chip type article;
   - a feed device for feeding said article to said first transfer path;
   - a printing device for printing on said article on said first transfer path and on another article on said second transfer path;
   - a removing device for removing said printed article from said second transfer path; and
   - an article reversing device for reversing upsidedown said printed article on said first transfer path and for delivering said article to said second transfer path, wherein said first and second transfer paths are formed along concentric circles.

2. A printing apparatus according to claim 1, further comprising an article positioning device located between said feed device and said printing device for adjusting positions of said articles on said first and second transfer paths.

3. A printing apparatus according to claim 1, wherein said first and second transfer paths are divided into a plurality of grooves which extend radially with respect to said concentric circles, and each groove is adapted to accommodate and transfer said article.

4. A printing apparatus according to claim 1, wherein said first and second transfer paths are formed in a same plane, and said article reversing device includes a reversing disk which rotates in a plane substantially perpendicular to said same plane, and grooves are formed in the peripheral edge of said disk to accommodate said article.

5. A printing apparatus according to claim 4, wherein an air blow-out port is provided to move said article on said first transfer path into one of said grooves formed in the peripheral edge of said disk.

6. A printing apparatus according to claim 4, wherein air shoots are provided between said first and second paths and said reversing disk, for respectively guiding said article from said first transfer path to the groove of said reversing disk, and from the groove of said reversing disk to said second transfer path.

7. A printing apparatus according to claim 1, wherein said article reversing device includes a flexible tube, and one end of said flexible tube is reversed with respect to the other end.

8. A printing apparatus according to claim 7, wherein an air suction port is provided at the other end of said tube, and said article on said first transfer path is sucked from one end of said tube and is discharged from the other end of said tube to said second transfer path.

9. A printing apparatus according to claim 7, wherein an air blow-out port is provided to deliver said article on said first transfer path to one end of said tube.

10. A printing apparatus according to claim 1, further comprising a drying device 6 for drying said printed article.

* * * * *